(12) United States Patent
Alanen et al.

(10) Patent No.: US 7,751,949 B2
(45) Date of Patent: Jul. 6, 2010

(54) ATMOSPHERE MODEL

(75) Inventors: Kimmo Marko Tapani Alanen, Lempäälä (FI); Jani Mikael Käppi, Ylöjärvi (FI); Jari Tapani Syrjärinne, Tampere (FI)

(73) Assignee: Nokia Corporation, Espoo (FI)

( * ) Notice: Subject to any disclaimer, the term of this patent is extended or adjusted under 35 U.S.C. 154(b) by 1032 days.

(21) Appl. No.: 11/445,976

(22) Filed: Jun. 1, 2006

(65) Prior Publication Data

US 2007/0016346 A1  Jan. 18, 2007

(30) Foreign Application Priority Data

Jun. 13, 2005 (GB) .................. 0511942.5

(51) Int. Cl.
*G01S 13/06* (2006.01)
(52) U.S. Cl. ..................... 701/4; 342/357.01
(58) Field of Classification Search .............. 701/4, 701/200, 207, 213, 214, 220; 342/357.01, 342/357.05, 357.06
See application file for complete search history.

(56) References Cited

U.S. PATENT DOCUMENTS

| 6,728,552 | B2 | 4/2004 | Chatain ..................... 455/556 |
| 6,735,542 | B1 | 5/2004 | Burgett et al. ................. 702/85 |
| 6,917,297 | B2 * | 7/2005 | Andrews et al. ............ 340/601 |
| 7,171,307 | B2 * | 1/2007 | Matsumoto .................... 702/3 |
| 7,586,438 | B1 * | 9/2009 | Lawrence et al. ...... 342/357.02 |

FOREIGN PATENT DOCUMENTS

| EP | 1 154 231 A1 | 11/2001 |
| WO | WO 00/58744 | 10/2000 |

* cited by examiner

*Primary Examiner*—Dalena Tran
(74) *Attorney, Agent, or Firm*—Harrington & Smith

(57) ABSTRACT

The invention relates to a time and location dependent atmosphere model and especially determining the altitude of a mobile terminal based on this model and the measured barometric pressure at the location of the terminal. The atmosphere model provides a long term, wide area barometric pressure model estimate.

31 Claims, 4 Drawing Sheets

ATMOSPHERE MODEL

FIELD OF THE INVENTION

The invention relates to atmosphere models and more specifically using time and location dependent wide area, long term atmosphere models. The invention also relates to a corresponding terminal, system, network element, software code and software program product.

BACKGROUND OF THE INVENTION

A pressure sensor or a barometer is an instrument that is used to measure atmospheric pressure. Atmospheric pressure is the pressure above any area in the Earth's atmosphere and it is caused by the weight of air. Atmospheric pressure decreases with increasing altitude as there are fewer air molecules as elevation increases.

The term atmospheric pressure refers to the pressure generated by the weight of the air surrounding the earth. The pressure as a function of altitude is not a linear function due to the compressibility of air; the atmosphere is denser at lower altitudes. The atmosphere is also not uniform, there are mounds and valleys that create high and low pressure areas. A barometric reading used by meteorologists measures the atmospheric pressure and is typically normalised to sea level. An absolute pressure transducer converts the normalised sea level pressure to an atmospheric pressure at a current altitude. The conversion can be done if the normalised sea level pressure and current altitude are known.

Pressure altitude is commonly used expression when referring to the vertical heights of objects in the atmosphere above the Earth's surface. Pressure altitude, which is actually an indication of the ambient pressure, is expressed in terms of the altitude at which that pressure would exist on a standard day defined by International Standard Atmosphere (ISA).

Furthermore, atmospheric pressure conditions vary widely on Earth, and these variations are important in studying weather and climate. Atmospheric pressure also shows a daily rhythm. This effect is very strong in tropical zones, whereas it is almost zero in polar zones. Barometers can be divided into two different groups: liquid and aneroid barometers. Liquid barometers can further be divided into water-based and mercury barometers.

Global navigation satellite systems (GNSS) can be used to determine location of the receiver. Examples of such systems are American GPS, Russian GLONASS and European Galileo of which GPS and GLONASS are currently operating and Galileo is planned to be in full operation in 2008. One drawback with the global navigation satellite systems is that altitude measurements are inherently less accurate than the horizontal measurements. The reason for this is geometry, namely in order to obtain accurate altitude measurements, satellites should be nearly overhead. Unfortunately this is not often the case.

European patent application EP1154231 by LUCENT TECHNOLOGIES INC., filed 20 Nov. 2000 discloses a communication device and method for estimating a more accurate vertical position or altitude of a communication device using atmospheric pressure measurements. A communication device measures local atmospheric pressure using a pressure sensor at a communication device and estimates an altitude of the communication device using the local measured barometric pressure and atmospheric pressure model information sent, for instance, by a base station. Atmospheric pressure model information corresponds to another atmospheric pressure measurement at a known elevation near the communication device.

A problem arises, if a user of the communication device moves frequently or the weather changes rapidly. According to prior art solutions, the user of the communication device should frequently download the latest atmospheric pressure model onto their phones so that the calibration information is up-to-date in changed weather conditions.

SUMMARY OF THE INVENTION

The applicant has recognised that there is a need to better take advantage of the atmospheric pressure models or atmosphere models. Especially long term, wide area atmosphere models could be better exploited for various purposes.

According to first aspect of the invention there is provided a method for determining the altitude of a mobile terminal using an atmosphere model and a barometric pressure measurement, wherein the atmosphere model provides a time dependent barometric pressure estimate.

The method may further comprise the atmosphere model providing a location dependent barometric pressure estimate.

The advantage of one embodiment is that communication network does not have to know the location of the communication device in order to provide up-to-date atmosphere model. Furthermore, there is no need to frequently send atmosphere model updates.

The method may further comprise the mobile terminal detecting its current location.

The method may further comprise the mobile terminal detecting its current location and sending it to a network element.

The method may further comprise the mobile terminal measuring the barometric pressure at its current location.

The method may further comprise the mobile terminal or the network element determining a time measurement.

The method may further comprise the mobile terminal receiving the atmosphere model from a network element.

The method may further comprise the mobile terminal calculating its current altitude based on the measured barometric pressure and the estimate provided by the atmosphere model.

The method may further comprise the mobile terminal sending the barometric pressure measurement to the network element.

The method may further comprise the network element calculating the altitude of the mobile terminal based on the barometric pressure measurement and the estimate provided by the atmosphere model.

The method may further comprise the network element sending the altitude measurement to the mobile terminal.

According to a second aspect of the invention there is provided a software code for implementing any of the method steps according to the first aspect of the invention.

According to a third aspect of the invention there is provided a software program product in which the software code according to the second aspect of the invention can be stored.

According to fourth aspect of the invention there is provided a mobile terminal capable of determining the altitude of a mobile terminal using an atmosphere model and a barometric pressure measurement, wherein said atmosphere model provides a time dependent barometric pressure estimate.

According to a fifth aspect of the invention there is provided a network element capable of sending an atmosphere model to a mobile terminal, wherein said atmosphere model provides a time dependent barometric pressure estimate.

The network element may further be capable of determining the altitude of a mobile terminal based on the barometric pressure measurement and the estimate provided by the atmosphere model and, wherein said atmosphere model provides a time dependent barometric pressure estimate.

According to a sixth aspect of the invention there is provided a system comprising a mobile terminal and a network element according to the fourth and fifth aspects of the invention.

BRIEF DESCRIPTION OF THE FIGURES

Other features of the present invention will become apparent from the following detailed description when considered in conjunction with the accompanying drawings, in which.

DETAILED DESCRIPTION OF EMBODIMENTS OF THE INVENTION

Some embodiments of the invention will now be described. These embodiments use the wide area, long term atmosphere model for calculating the altitude of the communication device. The atmosphere model provides at least a time dependent barometric pressure estimate. It is to be noted that the wide area, long term atmosphere model can also be used, for instance, for making weather forecasts, finding fishing areas, etc.

Figure 1:
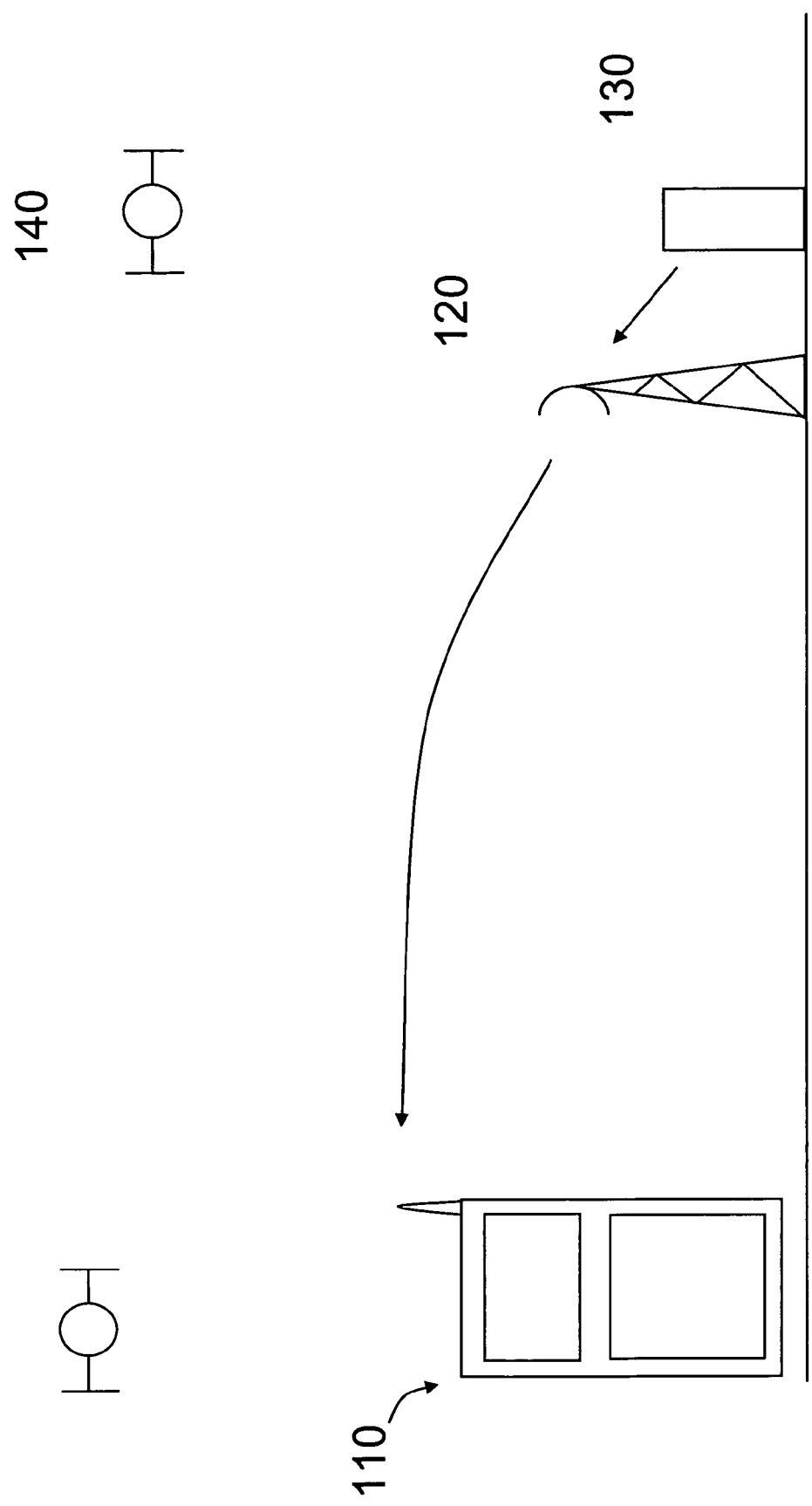
FIG. 1 illustrates a first communication device receiving an atmosphere model from the network.

FIG. 1 illustrates an operational environment in which embodiments of the present invention may exist. Specifically, in FIG. 1, there is shown a communication device 110, in this case a mobile phone handset, which according to the present embodiment includes a barometer. The communication device 110 could also be any other electronic device.

FIG. 1 also shows two communication network elements. First network element is an access point 120, in this case a base station. The first network element could also be any other access point capable of communicating with the communication device 110. The base station 120 can work according to any existing, for instance GSM, GPRS, EDGE, HSCSD, UMTS, CDMA 2000, IS95, etc., or future cellular network standards. Alternatively, base station 120 could act as an access point of a wireless local area network, such as any variation of 802.11 standard. Furthermore, base station 120 could be connected to the mobile phone handset with any other wireless or wired connectivity method. The second network element is a server 130. The second network element could also be any other network element capable of storing data and having communication capabilities with other network elements. Furthermore, FIG. 1 comprises two satellites 140.

The base station 120 communicates with the mobile phone handset 110 using any suitable communication means. In this embodiment the base station 120 uses RF transmissions in order to transmit signals to the mobile phone handset 110. Accordingly, the mobile phone handset receives transmissions sent by the base station 120. The mobile phone handset may also send signals to the base station 120. Thus, the communication may be two directional. The server 130 may locate physically in the same location as the base station 120.

The server 130 may as well locate in any other suitable place in the communication network. The server 130 communicates with the base station 120 using any suitable communications means. In this embodiment it communicates with the base station 120 with a wired link. Satellites 140 communicate at least with one of the following: the mobile phone handset 110 and the base station 120. Wireless communication link is used for signal transmissions between the satellites 130 and the handset 110 and between the satellites 130 and the base station 120.

Figure 2:
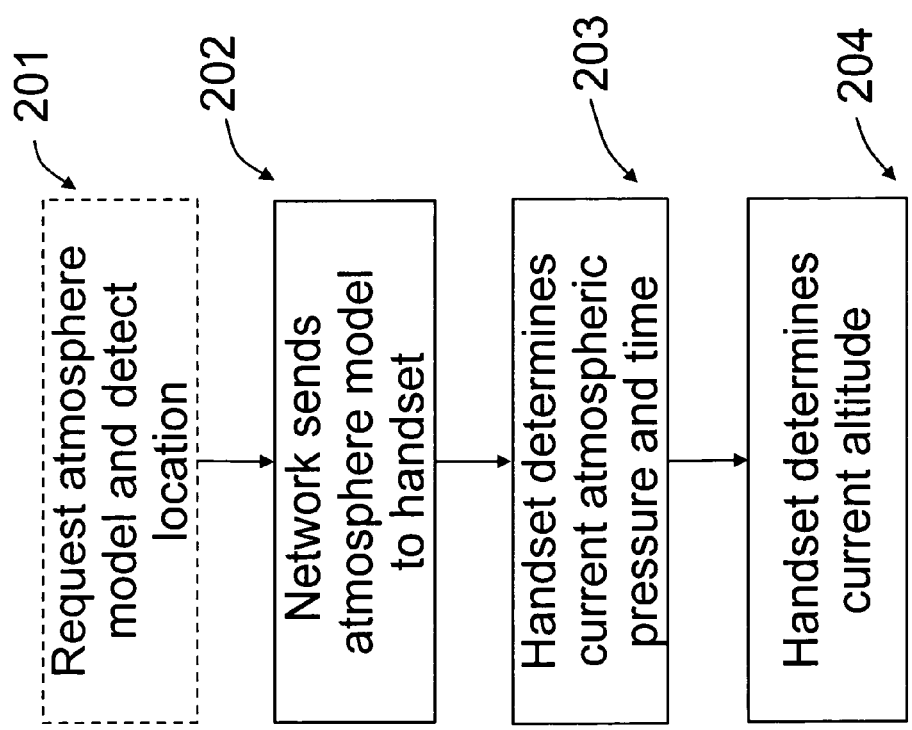
FIG. 2 is a flow chart illustrating a method according to a first embodiment in accordance with the invention.

FIG. 2 illustrates a method for determining altitude of the mobile phone handset 110. In general, at step 201, the mobile phone handset 110 sends a request to the communication network to obtain atmosphere model information from the communication network. Location of the handset 110 is also detected either by the handset 110 itself or any other network element. If the location is detected by the network element, the location information may have to be sent to the handset 110. At step 202, the communication network sends a wide area, long-term atmosphere model to the mobile phone handset 110. At step 203, the mobile phone handset determines time and the current atmospheric pressure in its current location. It has to be noted that time can be determined at any point before the step 204. At step 204, the mobile phone handset determines its altitude or elevation based on the current measured atmospheric pressure and the atmosphere model. It has to be noted that step 201 is optional and step 203 may take place before step 202. The location detection can also take place after the step 201. The location of the handset is detected so that the handset knows to request a valid atmosphere model.

Figure 3:
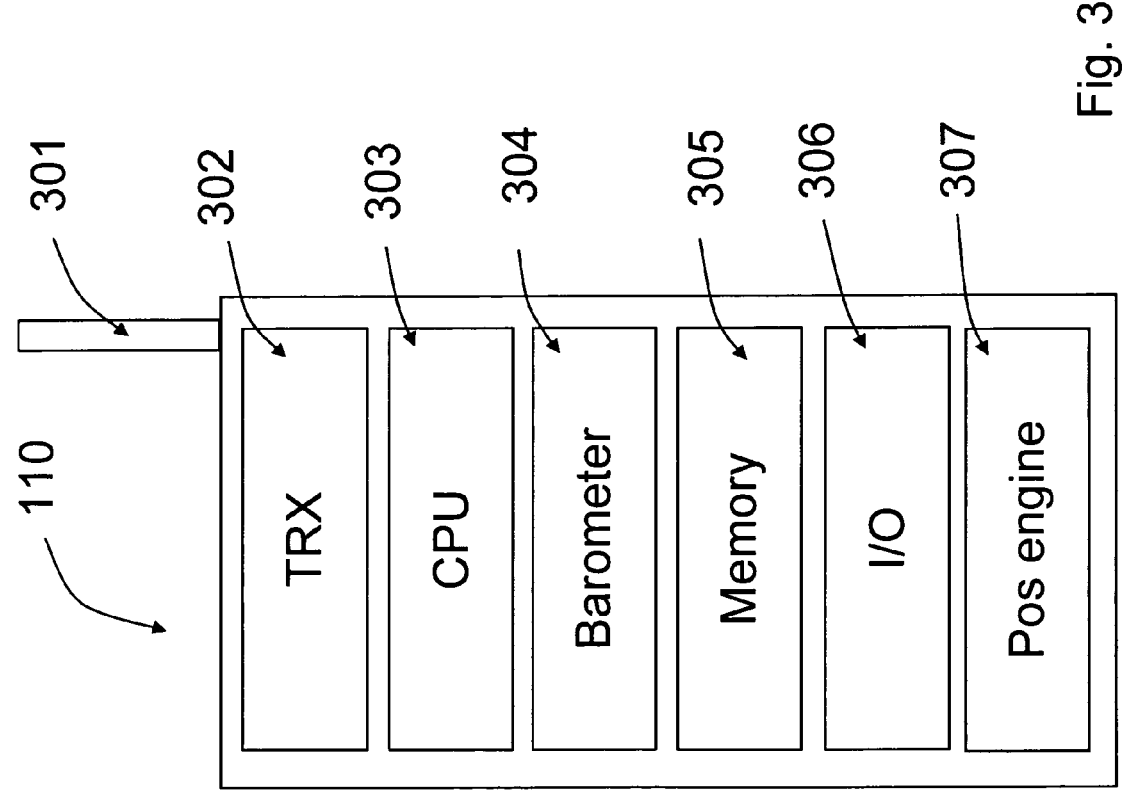
FIG. 3 is a block diagram illustrating a wireless terminal according to an embodiment of the invention.
Figure 4:
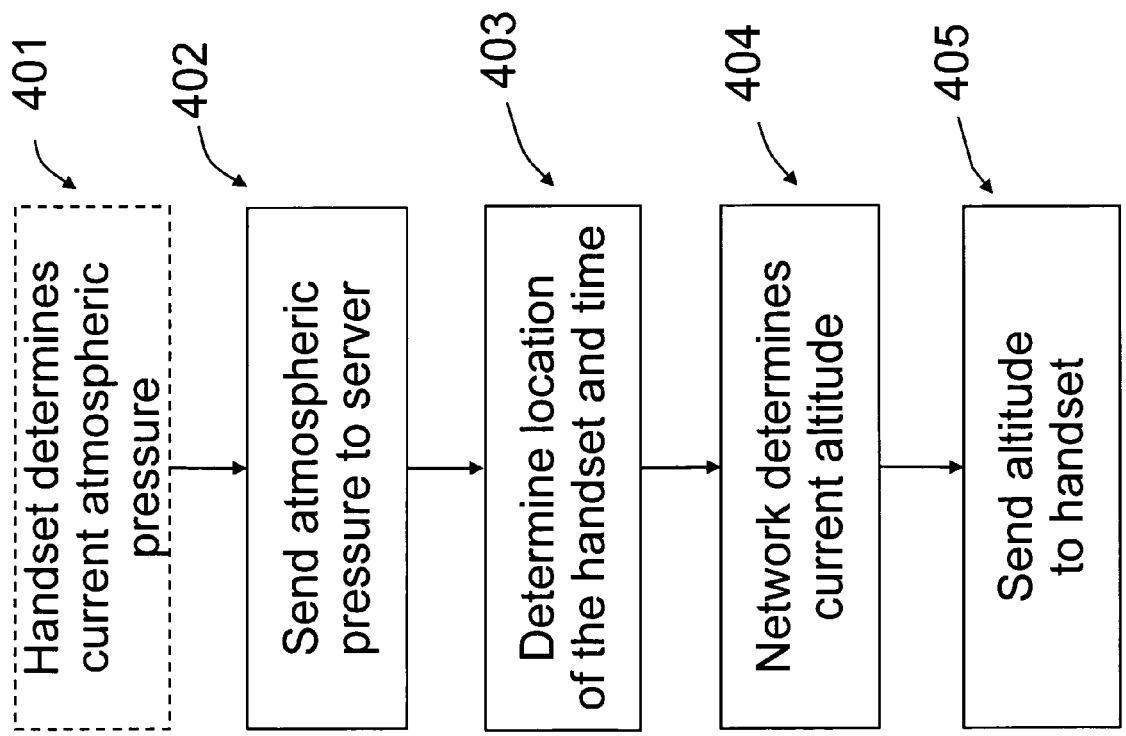
FIG. 4 is a flow chart illustrating a method according to a second embodiment in accordance with the invention.

FIG. 3 is a block diagram of the mobile phone handset 110 of FIG. 1. The handset 110 functions as a cellular telephone according to, for example, one or many of the following standards: GSM, GPRS, EDGE, HSCSD, UMTS, CDMA 2000, IS95, etc. The handset 110 also comprises a memory 305. The memory may have random access (RAM) and read only memory (ROM) parts. Suitable data can be stored on that memory. Furthermore, handset 110 contains input/output (I/O) means 306. Input means may be, for instance, a keyboard but it can also be a touch pad or a touch screen. A microphone may also be provided as an input means for receiving voice information. Output means may be provided, for instance, by a display, such as a liquid crystal display (LCD). A loudspeaker may also be provided as an output means for outputting speech or sound. Other suitable input/output means are also possible.

The handset 110 also includes a barometer 304. The barometer 304 is used to measure atmospheric pressure in the current location of the handset 110. For receiving and transmitting signals, the handset 110 includes an antenna 301. Two or more separate antennas could also be used, but in this embodiment the same antenna can receive and transmit satellite and cellular signals. For controlling the signal transmissions via the antenna 301, the handset 110 comprises a transceiver unit (TRX) 302.

The handset 110 also includes a central processing unit 303 (CPU) for controlling the transceiver unit (TRX) 302 and for centrally controlling functioning of the handset 110. The central processing unit includes at least one processor for processing data. The central processing unit is connected directly or indirectly to the memory unit 305 and the I/O means 306. According to the present embodiment, the handset 110 also includes a positioning engine 307 (pos engine). The positioning engine uses the information received from the satellites in order to calculate the location of the handset 110.

The operation of the handset 110 of FIG. 3 will now be described in more detail with reference to the flow chart of FIG. 2. In this exemplary embodiment handset 110 operates in a cellular communication network and the access point 120 is a base station of a cellular communication network. At step 201, the handset 110 requests an atmosphere model information from the network. The request can be sent using, for instance, a particular frequency and/or time slot. The atmosphere model request can be identified by the base station 120 also by using a special identifier, header or a sequence of tail bits. If the handset 110 is to be used in another environment than in a cellular communication network, then some other means for identifying the request may be used instead. At this step the location of the handset 110 can also be detected either by the handset 110 itself or by another network element. The location can also de detected later.

Base station 120 receives and identifies the request sent by the handset 110. The base station may have to forward the request to the server 130 located in the cellular communication network. On the server 130, weather information is stored. The weather information contains atmospheric pressure predictions for different geographical areas. The atmospheric pressure predictions can be long term predictions, for instance prediction for a whole week. Alternatively some shorter period predictions can be stored on the server 130 as well.

The atmospheric pressure predictions can also cover a large geographical area. There could be an atmospheric pressure prediction, for instance, for a whole country or state. The atmosphere model indicates the atmospheric pressure at a known altitude or elevation. This known altitude could be for instance a sea level.

At step 202, the server 130 sends the atmosphere model to the base station 120. The base station 120 further forwards this information to the handset 110. Again a particular frequency and/or time slot can be used in sending the atmosphere model. The atmosphere model request can be identified also by using a special identifier, header or a sequence of tail bits.

At step 203, the handset 110 determines time and the atmospheric or barometric pressure in its current location using the barometer 304. Time can be determined also before step 203 and as will explained later, it can be determined by some other network element as well. If the time is determined by some other element than the handset itself, it may be necessary to send the time information to the handset 110.

At step 204, the handset 110 determines the altitude at its current location. The altitude can now be determined since the atmospheric pressure at a known level at the current location of the handset 110 is known and the atmospheric pressure at the altitude of the handset 110 is also known. The altitude of the handset 110 at its current location can be derived from the difference of these atmospheric pressures, e.g. with reference to Laplace law of atmospheres:

$$P = P_o e^{-MgA/RT},$$

where $P_0$ is the pressure at sea level, M is the average molar mass of the air, R is the ideal gas constant, T is the gas temperature and A is the altitude for a given atmospheric pressure P. This equation can be approximated to for altitudes between −1000 and 35332 feet:

$$A = 145375(1-(P/P_0)^{0.1923}).$$

It has to be noted that it may not have to be necessary for the handset 110 to request the atmosphere model. Instead of the user of the handset 110 requesting the atmosphere model, the network could send the atmosphere model automatically to the handset 110 with certain intervals. Alternatively, the network can send the atmosphere model every time, when there is a significant change in the atmosphere model or the atmosphere model is going to expire. Also if the handset 110 moves away from the area where the atmosphere model is valid, there is a need to send updated atmosphere model to the handset 110. Furthermore, step 203 may take place before steps 201 and/or 202.

According to the second embodiment, the server 130 calculates the altitude of the handset 110 and no atmosphere model is sent to the handset 110. At step 401, the handset determines the atmospheric pressure in its current location using the barometer 304.

At step 402, the handset 110 sends the measured atmospheric pressure to the network. The base station 120 receives and identifies the atmospheric pressure sent by the handset 110. The base station 120 may further forward the measured atmospheric pressure to the server 130.

At step 403, the location of the handset 110 is detected. This can be done either by the handset 110 itself or by the network. The handset 110 could detect its location by using the positioning engine 307. The positioning engine 307 can be for instance a satellite positioning engine, such as a GPS engine. Any other suitable positioning engine can also be used. When the handset 110 has detected its location, it will send the location information to the base station 120, which may forward the location information to the server 130. Alternatively, the location of the handset 110 can be detected by the network. For instance cell identity can be used for this purpose. This is possible because each cell in a cellular network has got a unique code, known as a cell identity, which is used to identify the current cell. Further at step 403, time can be determined. This can be done either by the handset 110 or any other network element. It may be necessary to send the time information to the network element, which calculates the altitude of the handset 110. Time can be determined also before step 403.

Now that the current location of the handset 110 is known, the server 130 can define the atmospheric pressure for instance at a sea level in the current location of the handset. For this purpose the atmosphere model is needed. The altitude can now be determined since the atmospheric pressure at a known level in the current location of the handset 110 is known and the atmospheric pressure at the altitude of the handset 110 is also known. The altitude of the handset 110 in its current location can be derived from the difference of these atmospheric pressures using e.g. the Laplace law of atmospheres in accordance with the first embodiment of the invention.

At step 405, the network sends the detected altitude of the handset 110 to the handset 110. Then the handset 110 receives and identifies this information. The altitude or elevation of the handset 110 can be used, for instance, to speed up the acquisition procedure in the satellite positioning. When the exact altitude of the handset 110 is known, it is possible to acquire the first fix quicker and there needs to be fewer satellites visible for the handset 110.

The invention also relates to a corresponding software code, which can be used to implement at least some parts of the method according to the embodiments described above. The invention equally relates to a corresponding software program product in which a software code can be stored.

In the handset 110 all inventive features of this invention could be incorporated into a single module.

According to the first embodiment, the module includes at least the barometer 304. This module could also include at least one processor unit so that the altitude or elevation of the handset can be calculated. According to the second embodiment, this module is located in the server 130.

The invention also relates to a software program product in which the software code implementing the method steps in accordance with the invention can be stored.

The invention also relates to the handset 110, which comprises means for implementing the methods described above. According to the first embodiment, the handset 110 also comprises the module described above.

The invention also relates to the server 130, which comprises means for implementing the method steps described above. According to the second embodiment, the server 130 also comprises the module described above. Furthermore, atmosphere models for different regions and for different time periods are stored on the server 130.

Finally the invention relates to a system where the handset 110 can be used. The system comprises at least a handset 110 and the server 130.

It is to be noted that the described embodiments can be varied in many ways and that these are just exemplary embodiments of the invention.

The invention claimed is:

1. A method comprising:
   determining the altitude of a mobile terminal using a location dependent atmosphere model and a barometric pressure measurement, wherein the mobile terminal receives the location dependent atmosphere model from a network element, and wherein the location dependent atmosphere model provides time and location dependent barometric pressure estimates for different geographical areas over a long term that are valid for a location of the mobile terminal.

2. The method according to claim 1, wherein the barometric pressure measurement is done by the mobile terminal.

3. The method according to claim 1, wherein the method further comprises:
   the mobile terminal detecting its current location.

4. The method according to claim 1, wherein the method further comprises:
   the mobile terminal detecting its current location and sending it to the network element.

5. The method according to claim 1, wherein the method further comprises:
   the mobile terminal measuring the barometric pressure at its current location.

6. The method according to claim 1, wherein the method further comprises:
   the mobile terminal determining a time measurement.

7. The method according to claim 1, wherein the method further comprises:
   the network element determining a time measurement.

8. The method according to claim 1, wherein the method further comprises:
   the mobile terminal calculating its current altitude based on the measured barometric pressure and the estimate provided by the atmosphere model.

9. A software code embodied in a computer-readable medium, and configured to implement the method steps according to claim 1.

10. A software program product embodied in a computer-readable medium, and in which the software code according to claim 9 is stored.

11. A method comprising:
    determining the altitude of a mobile terminal using a location dependent atmosphere model and a barometric pressure measurement, wherein the mobile terminal sends the barometric pressure measurement to a network element, and wherein the location dependent atmosphere model provides time and location dependent barometric pressure estimates that are valid for a location of the mobile terminal.

12. The method according to claim 11, wherein the network element calculates the altitude of the mobile terminal based on the barometric pressure measurement and the estimate provided by the atmosphere model.

13. The method according to claim 12, wherein the network element sends the altitude measurement to the mobile terminal.

14. A mobile terminal comprising:
    at least one processor; and
    at least one memory including computer program code, the at least one memory and the computer program code configured to, with the at least one processor, cause the mobile terminal at least to perform:
    determining its current altitude using a location dependent atmosphere model and a barometric pressure measurement, wherein the mobile terminal is configured to receive the location dependent atmosphere model from a network element, and wherein the location dependent atmosphere model is configured to provide time and location dependent barometric pressure estimates for different geographical areas over a long term that are valid for a location of the mobile terminal.

15. The mobile terminal according to claim 14, wherein the mobile terminal is configured to obtain the barometric pressure measurement.

16. The mobile terminal according to claim 14, wherein the location dependent atmosphere model is configured to provide a location dependent barometric pressure estimate.

17. The mobile terminal according to claim 14, wherein the mobile terminal is configured to detect its current location.

18. The mobile terminal according to claim 14, wherein the mobile terminal is configured to detect its current location and send it to the network element.

19. The mobile terminal according to claim 14, wherein the mobile terminal is configured to measure the barometric pressure at its current location.

20. The mobile terminal according to claim 14, wherein the mobile terminal is configured to determine a time measurement.

21. The mobile terminal according to claim 14, wherein the mobile terminal is configured to send the barometric pressure measurement to the network element.

22. The mobile terminal according to claim 21, wherein the mobile terminal is configured to receive an altitude based on the barometric pressure measurement and the time dependent barometric pressure estimate provided by the location dependent atmosphere model.

23. A network element comprising:
    at least one processor; and
    at least one memory including computer program code, the at least one memory and the computer program code configured to, with the at least one processor, cause the network element at least to perform:
    sending a location dependent atmosphere model to a mobile terminal, wherein the location dependent atmosphere model is configured to provide time and location dependent barometric pressure estimates for different geographical areas over a long term that are valid for a location of the mobile terminal.

24. The network element according to claim 23, wherein the network element is configured to determine the altitude of a mobile terminal based on the barometric pressure measurement and the time dependent barometric pressure estimate provided by the location dependent atmosphere model and, wherein the location dependent atmosphere model is configured to provide a time dependent barometric pressure estimate that is valid for a location of the mobile terminal.

25. The network element according to claim 23, wherein the location dependent atmosphere model is configured to provide a location dependent barometric pressure estimate.

26. The network element according to claim 23, wherein the network element is configured to receive the current location of the mobile terminal from the mobile terminal.

27. The network element according to claim 23, wherein the network element is configured to determine a time measurement.

28. The network element according to claim 23, wherein the network element is configured to receive the barometric pressure measurement from the mobile terminal.

29. The network element according to claim 28, wherein the network element calculates the altitude of the mobile terminal based on the barometric pressure measurement and the time dependent barometric pressure estimate provided by the location dependent atmosphere model.

30. The network element according to claim 29, wherein the network element is configured to send the altitude measurement to the mobile terminal.

31. A system comprising:
a network element configured to send a location dependent atmosphere model to a mobile terminal; and
a mobile terminal configured to receive the location dependent atmosphere model from the network element, wherein the mobile terminal is configured to determine its current altitude using the location dependent atmosphere model and a barometric pressure measurement, and wherein the location dependent atmosphere model is configured to provide time and location dependent barometric pressure estimates for different geographical areas over a long term that are valid for a location of the mobile terminal.

* * * * *